United States Patent [19]

Vyshkina

[11] Patent Number: 5,744,563

[45] Date of Patent: Apr. 28, 1998

[54] MANNICH BASE COPOLYMER AND METHOD FOR MAKING IT

[76] Inventor: Tamara V. Vyshkina, 50 Quentin Rd., Brooklyn, N.Y. 11223

[21] Appl. No.: 802,893

[22] Filed: Feb. 18, 1997

Related U.S. Application Data

[63] Continuation of Ser. No. 514,397, Aug. 11, 1995, abandoned.

[51] Int. Cl.$^6$ .................. C08F 226/02; C08F 2/10
[52] U.S. Cl. ............................ 526/307.3; 526/80
[58] Field of Search ..................... 526/307.3, 80

[56] References Cited

U.S. PATENT DOCUMENTS

| | | | |
|---|---|---|---|
| 3,247,171 | 4/1966 | Walker et al. | 260/80.3 |
| 3,539,535 | 11/1970 | Wisner et al. | 260/72 |
| 3,790,529 | 2/1974 | Fujimura et al. | 260/72 R |
| 3,864,312 | 2/1975 | Suzuki et al. | 260/67.5 |
| 3,984,333 | 10/1976 | de Kraats et al. | 252/8.55 D |
| 4,021,394 | 5/1977 | Tuka et al. | 260/29.4 |
| 4,022,741 | 5/1977 | Tuka et al. | 260/29.4 |
| 4,113,685 | 9/1978 | Hubner et al. | 524/421 |
| 4,463,151 | 7/1984 | Schulz et al. | 526/307.5 |
| 4,702,844 | 10/1987 | Flesher et al. | 210/733 |
| 4,789,695 | 12/1988 | Farrar et al. | 523/336 |
| 4,956,399 | 9/1990 | Kazakiewicz et al. | 524/223 |
| 5,037,881 | 8/1991 | Kazakiewicz et al. | 524/812 |

*Primary Examiner*—Joseph L. Schofer
*Assistant Examiner*—Wu C. Cheng
*Attorney, Agent, or Firm*—Robert L. Stone

[57] ABSTRACT

A flocculant copolymer of acrylamide and Mannich base of acrylamide is provided which purifies and treats water and/or waste water, and/or sludge, and/or other contaminated liquids resulting from municipal discharges and industrial process effluents, as well as separating suspended and colloidal particles from liquids in industrial manufacturing processes. The copolymer has the general formula:

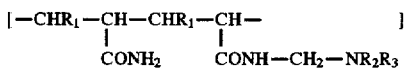

wherein $R_1$ is hydrogen or $C_{1-4}$ alkyl groups, $R_2$ and $R_3$ are $C_1$ to $C_8$ alkyl groups and may be the same or different.

It is prepared in two stage reaction. In the first stage Mannich base of acrylamide is produced by reacting acrylamide with formalin and dimethylamine or other secondary $C_{1-8}$-alkylamines:

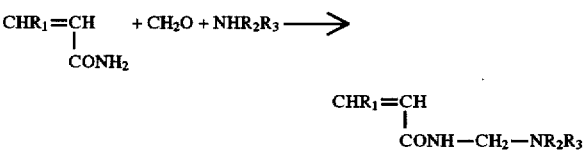

and in the second stage copolymer of acrylamide and Mannich base of acrylamide is produced by polymerizing in the presence of redox-initiator system. The mole ratio of acrylamide to Mannich base of acrylamide of 1:(0.05–0.1) is preferred to obtain the copolymer which does not significantly cross-link.

5 Claims, No Drawings

MANNICH BASE COPOLYMER AND METHOD FOR MAKING IT

This is a Continuation of application Ser. No. 08,514,397 filed Aug. 11, 1995, now abandoned.

FIELD OF THE PRESENT INVENTION

The present invention relates to creation of new and useful flocculant polymer which can be used in water and/or waste water, and/or sludge treatment processes, and/or other contaminated liquids resulting from a variety of municipal discharges and industrial process effluents, as well as to separate suspended and colloidal particles from liquids in industrial manufacturing processes. The liquids which can be treated with the new flocculant are very diverse. For exemplary purposes only a partial list of some of them includes but is not limited to: (1) potable surface water, ground water, and industrial process water; (2) sewage, municipal waste water and/or a combination thereof with industrial liquid wastes; (3) sludge and elutriate from sludge; (4) filter backwash water; (5) industrial waste water from petroleum processing and petroleum products manufacturing and processing operations; (6) waste water from chemical, cosmetics, flavors, soap, fragrance, dyes and pharmaceutical product manufacturing and processing operations; (7) waste water from ore concentration and coal preparation operations; (8) water and waste water related to nuclear power plants; (9) waste water from metallurgical processes, particularly recycling water, cooling water, exhaust control wet scrubbers; (10) electroplating process waste streams; (11) liquid streams from agricultural operations; (12) soil remediation and treatment; (13) waste water from tanning operations; (14) waste water from mining operations; (15) oil, grease and fat contaminated wastes; (16) waste water from meat, corn starch, dairy products, beverages, and other food processing operations, (17) textile, leather processing, and paper mill factories waste streams, etc.

BACKGROUND AND PRIOR ART

As illustrated below, it is well known to use water soluble synthetic polymeric materials derived from ethylenically unsaturated monomers such as acrylamide and derivatives thereof as thickeners and flocculants.

It has also been increasingly believed in the water treatment industry that no single flocculant polymer would be effective for a wide variety of processes and that instead it is necessary to have available a large number of specific flocculant polymers.

Mannich bases of high molecular weight polyacrylamide are relatively new class of flocculant polymers and are useful in flocculation processes. They can be made by polymerizing the Mannich base of acrylamide or by converting polyacrylamide into its Mannich base by reacting it with amine and formaldehyde.

However, a well known drawback of polyacrylamide Mannich bases is their tendency to cross-link, especially at high solids contents. Consequently, these polymers are generally made as dilute aqueous solutions in an attempt to slow down the rate of interpolymer cross-linking. This involves the transport of large volumes of water. Furthermore, even these solutions are subject to cross-linking during storage.

It is known a method to try to avoid the problem of large volumes of water and/or cross-linking by forming the Mannich base at the point of use by adding amine type compound and formaldehyde to a solution of polyacrylamide. This is described in U.S. Pat. No. 4,789,695 which describes the method of making Mannich base of high molecular weight acrylamide polymer by reacting, in aqueous solution, the polymer with a Mannich base of a low molecular weight compound such as urea. A major disadvantage of this is that a true reaction may not occur and that it is difficult or impossible to extract from the resultant solution an isolatable Mannich base of the polymer. This, therefore, requires an excess of low molecular weight compound to shift the equilibrium from Mannich base of the low molecular weight to form Mannich base of the polymer. Another disadvantage of the flocculant is that when amine and formaldehyde are blended before addition the blend tends to be unstable. Accordingly, it is generally necessary to supply them separately into the polyacrylamide solution which is expensive and environmentally undesirable.

When Mannich base polyacrylamide has been used as flocculant the solids level must be kept low, particularly for very high molecular weight Mannich base polymers, owing to the ability of these polymers to thicken water. As a result, solids levels of very high molecular weight Mannich base polymers generally are maintained below 10%, so that the solutions can be pumped and handled conveniently.

U.S. Pat. No. 4,956,399 describes Mannich (alk) acrylamide microparticles which are produced with high solids content without a significant increase in bulk viscosity by inverse microemulsion polymerization and to improve dewatering characteristics. The Mannich acrylamide polymers of this invention are isolated as individual or, at most, several polymer molecules in each aqueous microemulsion micelle to prevent cross-linking. Major disadvantages of this technique are the use of additional chemicals, particularly oil and surfactant, for microemulsion formation and additional steps in industrial processing such as water and oil admixing for microemulsion formation and release of water from a dispersion.

It is also known that during many industrial applications, the conditions practiced involve exposing an aqueous medium containing the high molecular weight water-soluble polymer such as Mannich base polymer to high speed shear. Such shear often causes mechanical degradation of the polymer and flocculated particles which thus reduces the viscosity of the aqueous medium and flocculation properties of the polymer. While lower molecular weight polymers are less sensitive to shear degradation, they must be used in much higher concentrations in order to achieve the desired level of flocculation.

In recent years there have been proposals to make polymers having improved thickening power and stability in hydrodynamic fields with high Reynolds numbers, especially when the aqueous medium contains an electrolyte, by incorporating pendant hydrophobic groups. The hydrophobic groups tend to associate with one another in an aqueous solution, resulting in an increase in viscosification efficiency relative to a polymer without the hydrophobic side groups.

U.S. Pat. Nos. 4,463,151 and 4,702,844 describe such polymers. A major drawback of these inventions is that since these flocculants contain hydrophobic groups it is highly improbable that they would serve as flocculants since good flocculation generally requires a highly water soluble polymer.

U.S. Pat. No. 3,984,333 describes the method of thickening an aqueous medium by dissolving a block copolymer having water-soluble and water-insoluble blocks in the aqueous medium. While such block copolymers apparently exhibit reasonably good resistance to shear degradation, such polymers are difficult and often impractical to prepare. More importantly, such polymers do not exhibit significant tolerance to electrolytes normally present in the aqueous media to be thickened.

In order to overcome these problems, it has been a common practice to cross-link the polymer to improve resistance to shear as well as thermal degradation. See, for example, U.S. Pat. No. 3,247,171.

Consequently, the ability of Mannich base polymers to cross-link, when regulated, could be an advantage which could increase resistance of flocculants to internal hydraulic shear degradation during pumping and mixing polymer solutions.

U.S. Pat. No. 4,021,394 and U.S. Pat. No. 4,022,741 describe continuous processes for the preparation of Mannich base polymers which entail inverting an inverse emulsion polymer in a process stream containing formaldehyde and a secondary amine. U.S. Pat. No. 5,037,881 describes the method of making Mannich acrylamide polymers in the form of inverse microemulsions which can be prepared at high solids content while maintaining a very low bulk viscosity. Major shortcomings of these processes are the need to store multiple chemicals on site and the problems inherent in running chemical reactions at such locations.

U.S. Pat. No. 3,864,312, U.S. Pat. No. 3,539,535 and U.S. Pat. No. 3,790,529 describe dry Mannich base polymers which, when dissolved in water, react to produce Mannich base polymer solution. Major drawbacks of these approaches are cross-linking problems and the reversibility of the Mannich reaction.

SUMMARY OF THE INVENTION

In order to overcome the deficiencies of the prior art, it is a major object of the present invention to provide a copolymer of acrylamide and Mannich base of acrylamide and a method for making it which is based on Mannich reaction of acrylamide with formalin and dimethylamine or other $C_{1-8}$-alkylamines and following co-polymerization of Mannich base acrylamide with acrylamide in water solution using redox-initiator system.

It is a further object to provide a flocculant having low cross-linking tendency and consequently low viscosifying properties and a method for making it.

It is a further object to provide a flocculant which can be used at high concentrations when needed and at high solids content solutions and a method for making it.

It is a further object to provide a flocculant characterized by its high stability against shear degradation (which would result in the low concentration of polymer in solution when used in water treatment) and a method for making it.

It is a further object to provide a flocculant which is stable during storage compared with conventional flocculants and a method for making it.

In accordance with the objectives, the invention is a new flocculant and a method of preparation it which is copolymer of acrylamide and Mannich base of acrylamide made by the Mannich reaction of acrylamide and following copolymerization of the Mannich base of acrylamide with acrylamide.

The proposed flocculant and the method for making it provide an efficient means for treating liquids, particularly water, wastewater and sludge.

The copolymer of an acrylamide and Mannich base of acrylamide contains a repeating unit having the general formula:

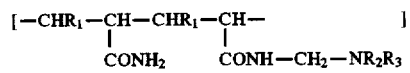

wherein $R_1$ is hydrogen or $C_{1-4}$ alkyl groups, $R_2$ and $R_3$ are $C_1$ to $C_8$ alkyl groups and may be the same or different.

DETAILED DESCRIPTION OF THE INVENTION

The process of manufacturing Mannich base copolymer is revealed which poses a two stage reaction. In the first stage of the process Mannich base acrylamide is produced by reacting acrylamide with formalin and dimethylamine or other secondary $C_{1-8}$-alkylamines. The reaction is:

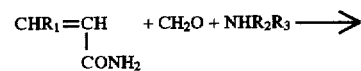

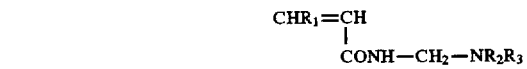

In the second stage copolymer of acrylamide and the above Mannich base of acrylamide is produced by polymerizing in the presence of redox-initiator system. A mole ratio of acrylamide to Mannich base of acrylamide of 1:(0.05–0.1) is preferred in order to obtain polyacrylamide copolymer which does not significantly cross-link. The polymerization is effected in aqueous solution at about 5° C. to about 30° C. over a period of at least 6 hours.

The backbone of the Mannich base copolymers of the present invention may comprise units of such (alk) acrylamides as acrylamide, methacrylamide, ethacrylamide and the like.

The backbones of the Mannich base copolymers of the present invention may also comprise a Mannich base (alk) acrylamide copolymerized with a cationic, anionic, or non-ionic, water-soluble, ethylenically unsaturated comonomers.

Useful cationic monomers include diallyl dialkylammonium chlorides, N,N-$C_{1-8}$-dialkylaminoalkyl(meth) acrylates, N,N-$C_{1-8}$-dialkylaminoalkyl(meth)acrylamides and salts including quaternary salts and mixtures thereof.

Anionic monomers useful in the practice of this invention may comprise acrylic or methacrylic acid, fumaric acid, crotonic acid, maleic acid, salts thereof and the like.

As used herein "formaldehyde" and "$CH_2O$" include formaldehyde, paraformaldehyde and formalin and mixtures thereof. Formalin, a 40% water solution of formaldehyde, is preferred.

Secondary amines suitable for use in the practice of this invention are alkylamines containing from 1 to 8 carbon atoms in which the alkyl group is cyclic, straight chained or branched.

Suitable monomers are non-ionic, anionic and cationic and are as defined above. The aqueous monomer solution may contain chelating agents to remove polymerization inhibitors, chain-transfer agents, initiators and other conventional additives including agents which adjust the pH, for instance about 6.3–6.8.

A redox initiator system is used in conjunction with high monomer concentration (about 10% to 50%) and a low temperature (about 5° C. to 30° C.). A redox catalyst system is composed of a water-soluble tertiary amine, such as triethylamine, as the reducing agent in combination with a water-soluble persulfate, such as an alkali metal (e.g. Na or K) or ammonium persulfate, as the oxidizing agent in a mole ratio of persulfate salt to tertiary amine of about 2 to 6, preferably 4. Other redox type initiators may also be used. These may be prepared by combining a peroxide such as hydrogen peroxide, an alkyl peroxide, or a persulfate such as potassium or ammonium persulfate with a reducing agent such as a tertiary amine, a sulfite, a ferrous or ferric salt and/or an azoinitiator such as azobisisobutyronitrile. The redox system is used in amount of about 0.1 to 0.01 g per 100 g of acrylamide monomer.

The copolymer may be recovered from the reaction mixture containing about 10% to about 50% of monomer in solution with the concentration of Mannich base of acrylamide being about 5 to about 10 mole % of the amount of acrylamide by precipitation with non-solvents for the copolymer, such as acetone or methanol. Alternatively, the polymer may be recovered by drying the reaction mixture with heated air or nitrogen.

DETAILED DESCRIPTION OF THE PREFERRED EMBODIMENT

Mannich Base Acrylamide

In the preferred embodiment acrylamide, formalin and dimethylamine are used. 30 g of formalin is added to a resin pot fitted with a stirrer, thermometer and a condenser. 75 g of 60% dimethylamine is added slowly via a separating funnel at such rate as to ensure that the temperature remained less than 40° C., generally below 30° C. The reaction is continued for 2 hours and 71 g of acrylamide then added. The reaction mixture is then stirred until a clear solution is obtained.

The mono-substituted Mannich base acrylamide is thus formed using equimolar proportions of dimethylamine, formalin and acrylamide in 500 mL of water solution to give the Mannich base of acrylamide of molecular weight 128 and melting point of 87.4° C.

Copolymerization 0.05 g of redox catalyst of potassium sulfate and triethylamine (TEA) in a mole ratio of persulfate salt to TEA of about 4 is used with aqueous solutions containing 10% of monomer in which the concentration of Mannich base of acrylamide is 10 mole per cent of the amount of acrylamide monomer. The polymerization is conducted in the absence of oxygen for about 6 hours.

A one liter water jacketed reaction flask with a mechanical stirrer made of glass and a Teflon blade is used as a polymerization vessel. Fifty grams of twice recrystallized (from acetone) acrylamide and 25 mL of Mannich base of acrylamide solution are added and the flask is twice alternatively evacuated and purged with nitrogen. The nitrogen is purified by passing it through a filter to remove particulates and a pyrogallol solution to remove residual oxygen. Next, 500 mL of boiled, deionized water is added and the vacuum-$N_2$ purge carried out twice more. When dissolution is complete and the temperature is brought to 20° C., 0.020 g of solid $K_2S_2O_8$ and then 0.10 mL of a solution containing 0.0028 g of TEA are added (a mole ratio of $K_2S_2O_8$ to TEA of 4:1). The stirring is discontinued about three hours after the initiator is added. The reaction continues overnight while nitrogen bubbles slowly into the mixture. The product is a gel-like mass. Copolymer was precipitated by adding three volumes of acetone.

Molecular Weight Testing

The molecular weight of the polymer was determined using intrinsic viscosity (IV) by the formula:

$$IV=0.000373\times(\text{molecular weight})^{0.66}$$

The IV measurement is taken with a four (4) bulb Cannon-Ubbelohde capillary viscometer at concentrations of 100, 250, 500 and 1,000 mg/L in 1 molar sodium chloride at 30° C. and at shear rates ranging between 50–1,000 $\sec^{-1}$. The data thus obtained is subjected to linear regression to extrapolate it to zero shear rate and zero polymer concentration. The value obtained with this calculation is the intrinsic viscosity of the polymer—15 dL/g. The molecular weight of the polymer thus obtained is about 10 million.

Dissolvability Testing

The dissolution characteristics of a flocculant polymer composition may be tested by the following procedure: A standard 600 mL laboratory beaker is filled with 400 mL of distilled water at 30° C. A 5 cm magnetic stirring bar is placed in the beaker and the stirring speed is adjusted to yield a vortex of approximately 19 cm diameter at the level of the stirring bar (the bottom of the beaker). 0.8 mL of the composition is added to the vortex. Samples of the mixture are withdrawn periodically in a viscosity cup having an orifice at the bottom, and the efflux time is recorded as the viscosity in empirical units. The specific viscosity $N_{sp}$ is calculated according to the following formula:

$$N_{sp}=\frac{(\text{Viscosity of Mixture})-(\text{Viscosity of Water})}{(\text{Viscosity of Water})}$$

As the polymer dissolves in water, the viscosity of the solution increases, so that successive samples typically show progressively higher specific viscosity. The procedure is continued until the viscosity stabilizes. The specific viscosity at this point is taken as the ultimate specific viscosity. The dissolution time referred to in this disclosure is taken as the time after addition of the polymer required for the specific viscosity in the aforementioned empirical units to reach 50% of the ultimate specific viscosity.

The results are as given in Table 1.

TABLE 1

Results of Testing of Rate of Solution

| Time after Addition (min.) | Viscosity, Efflux Time (sec.) | $N_{sp}$ | Percent of Ultimate Specific Viscosity $N_{sp}$ Reached at Indicated Time |
|---|---|---|---|
| 0 (dist. w.) | 14.45 | — | — |
| 3 | 26.14 | 1.23 | 78 |
| 10 | 38.27 | 1.45 | 89 |
| 21 hours | 42.55 | 1.57 | 100 |

Flocculant Activity Testing

The polymer was tested as a flocculant by comparing it to a very high molecular weight (10 million) non-ionic acrylamide homopolymer. Solutions of both polymers were made so that the final dilution contained 0.00025 wt. per cent solids. Accordingly, one (1) milliliter (mL) contained about 0.0025 milligram (mg) polymer solids and one (1) drop contained 0.000125 mg polymer solids.

The samples tested were a standard dirt slurry augmented with calcium chloride and repulped newsprint slurry.

Each flocculant was added drop-wise to a sample until good flocculation of the solids and good clarity of the supernatant were obtained.

The 40 mole per cent high molecular weight polymer of the invention was found to be effective at one-third the dosage of the 40 mole per cent "standard" polyacrylamide.

The foregoing is a description of the preferred embodiment for purpose of illustration. Alternatives and modifications will be understood by those skilled in the art.

I claim:

1. A flocculant copolymer of acrylamide and Mannich base of acrylamide containing the repeating unit

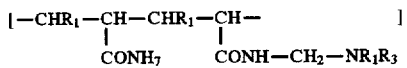

wherein $R_1$ is hydrogen or $C_{1-8}$ alkyl groups, $R_3$ and $R_4$ are $C_1$ to $C_8$ alkyl groups and may be the same or different, wherein said copolymer is prepared in two stages, the first stage comprising forming a Mannich base of an acrylamide by reacting a secondary amine having the formula $NHR_2R_3$ wherein $R_2$ and $R_3$ are $C_1$ to $C_8$ alkyl groups with an acrylamide and a formaldehyde to form the Mannich base of the acrylamide and the second stage comprising copolymerizing said Mannich base of an acrylamide with an acrylamide in a mole ratio of acrylamide to Mannich base of acrylamide of 1:(0.05–0.1) in aqueous solution in the presence of a redox polymerization initiator at about 5° C. to about 30° C. for at least 6 hours and wherein said copolymer is recovered form said solution.

2. The copolymer claimed in claim 1 wherein said $C_1$ to $C_8$ alkyl groups $R_2$ and $R_3$ are each cyclic, straight chained or branched alkyl groups.

3. The copolymer claimed in claim 1 wherein $R_1$ is hydrogen.

4. The copolymer claimed in claim 1 wherein the acrylamide employed in each of the first and second stages is acrylamide, methacrylamide or ethacrylamide.

5. The copolymer claimed in claim 4 wherein acrylamide is employed.

* * * * *

UNITED STATES PATENT AND TRADEMARK OFFICE
CERTIFICATE OF CORRECTION

PATENT NO. : 5,744,563
DATED : April 28, 1998
INVENTOR(S) : TAMARA V. VYSHKINA

It is certified that error appears in the above-identified patent and that said Letters Patent is hereby corrected as shown below:

On the cover page, insert in the left column under the [76] line and above the [21] line:

--[73] Assignee: American EnviroCare, Inc., East Brunswick, NJ--

Signed and Sealed this

Twenty-fourth Day of August, 1999

Attest:

Q. TODD DICKINSON

*Attesting Officer*   *Acting Commissioner of Patents and Trademarks*